(12) United States Patent
Goupil et al.

(10) Patent No.: US 12,534,180 B2
(45) Date of Patent: Jan. 27, 2026

(54) DEVICE FOR SEALING A JOINT BETWEEN A WING BOX AND A CENTRAL FUSELAGE OF AN AIRCRAFT, CORRESPONDING SEALING PROCESSES AND CORRESPONDING AIRCRAFT

(71) Applicant: Airbus Operations SAS, Toulouse (FR)

(72) Inventors: Frédéric Goupil, Toulouse (FR); Ghislain Viauvy, Toulouse (FR); Vincent Fauchille, Toulouse (FR); Caroline Le, Toulouse (FR); François Bignebat, Toulouse (FR); Nicolas Garres, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/753,489

(22) Filed: Jun. 25, 2024

(65) Prior Publication Data
US 2024/0425169 A1    Dec. 26, 2024

(30) Foreign Application Priority Data

Jun. 26, 2023  (FR) ...................................... 2306646

(51) Int. Cl.
*B64C 1/26* (2006.01)
*F16J 15/02* (2006.01)

(52) U.S. Cl.
CPC ............... *B64C 1/26* (2013.01); *F16J 15/028* (2013.01)

(58) Field of Classification Search
CPC ... B64C 1/26; F16J 15/02; F16J 15/021; F16J 15/022; F16J 15/028
See application file for complete search history.

(56) References Cited

U.S. PATENT DOCUMENTS

2020/0189713 A1    6/2020   Murphy et al.

FOREIGN PATENT DOCUMENTS

| DE | 10020493 A1 | 11/2001 | |
| EP | 3260708 A1 * | 12/2017 | ............... B64C 3/26 |
| KR | 200325711 Y1 | 9/2003 | |

OTHER PUBLICATIONS

French Search Report for corresponding French Patent Application No. 2306646 dated Nov. 16, 2023.

* cited by examiner

*Primary Examiner* — Gilbert Y Lee
(74) *Attorney, Agent, or Firm* — Greer, Burns & Crain, Ltd.

(57) ABSTRACT

A device for sealing a joint between a wall of a wing box and a wall of a central fuselage of an aircraft, the device comprising at least one deformable element clamped between a first and a second rigid end element. The device moreover comprises clamp for moving the first and second rigid end elements closer to one another so as to deform the at least one deformable element by crushing until it is pressed against the walls of the joint.

13 Claims, 7 Drawing Sheets

DEVICE FOR SEALING A JOINT BETWEEN A WING BOX AND A CENTRAL FUSELAGE OF AN AIRCRAFT, CORRESPONDING SEALING PROCESSES AND CORRESPONDING AIRCRAFT

CROSS-REFERENCES TO RELATED APPLICATIONS

This application claims the benefit of French Patent Application Number 2306646 filed on Jun. 26, 2023, the entire disclosure of which is incorporated herein by way of reference.

FIELD OF THE INVENTION

The present invention relates to a device for sealing a joint between a wing box and a central fuselage of an aircraft, in particular in order to seal a fuel tank formed in the wing box. The invention also relates to a process for sealing such a joint and to an aircraft having at least one such sealing device.

BACKGROUND OF THE INVENTION

It is known practice to use the wing box of an aircraft to form a fuel tank. However, such a solution requires perfect sealing at the joint between the wing box and the central fuselage of the aircraft to form the fuel tank. As a matter of fact, the assembly of the parts of the wing box and of the central fuselage at this joint creates a lot of openings which must be sealed in order to avoid fuel leaks.

One known technique for sealing the joint between the wing box and the central fuselage of the aircraft consists in injecting a sealing product containing small foam particles into these openings. To do this, an operator must firstly place a blocking element at each opening left free between the wing and the central fuselage, which blocking element ensures the sealing product can flow in a single direction while it is being injected. They must then position an adhesive element for introducing the sealing product having a hole for receiving the injection nozzle of the gun for injecting sealing product that makes it possible to guide the sealing product towards the inside of the opening. Lastly, the operator can inject the sealing product into the opening using the injection gun.

A drawback of this technique is that the sealing product must be injected by an operator via the inside of the wing box. However, the space within the wing box is very restricted and the openings to be plugged with the sealing product are difficult for the operator to access, and they must therefore inject the product in very uncomfortable positions. In addition, in recent years, the height of the wings has been caused to decrease in order to improve the performance of the wings of the aircraft. The risks are that this technique is therefore increasingly complex to implement and the problems in terms of ergonomics for the operators increase quite significantly. This technique is therefore not satisfactory.

It is therefore necessary to provide a solution for sealing a joint between the wing box and the central fuselage of an aircraft which at least partially overcomes the drawbacks described in relation to the prior art.

SUMMARY OF THE INVENTION

An object of the present invention is to propose a device for sealing a joint between at least one wall of a wing box of an aircraft and at least one wall of a central fuselage of said aircraft which is reliable and simple to implement.

To this end, a sealing device is proposed, comprising:
at least one deformable element having a first bore, said at least one deformable element being intended to come into contact with said at least one wall of said wing box and said at least one wall of said central fuselage of said aircraft;
a first rigid end element having a second bore and a second rigid end element having a third bore, said second bore and third bore extending coaxially with said first bore, said first and second rigid end elements being disposed on either side of said at least one deformable element and being intended to clamp said at least one deformable element; and
clamping means having a nut and a clamping screw, said nut having a tapped portion and being disposed against one of said rigid end elements and said clamping screw having a screw head and a threaded shank, said screw head being disposed against the other one of said rigid end elements and said threaded shank being fitted in said first, second and third bores so as to be screwed to said nut.

Said clamping means are movable between an inactive position, in which said clamping means do not clamp the first rigid end element and the second rigid end element towards one another and leave said at least one deformable element in an undeformed initial position, and a clamping position, in which said clamping means clamp the first rigid end element and the second rigid end element towards one another by deforming said at least one deformable element by crushing until said at least one deformable element is pressed against said at least one wall of said wing box and against said at least one wall of the central fuselage.

Said rigid end element against which said nut is disposed has a recess for receiving and holding said nut, preventing the rotation of said nut relative to said rigid end element during the clamping and unclamping of the clamping means.

Such a sealing device makes it possible to ensure the sealing of a joint while at the same time enabling simple and easy installation from the outside of the aircraft. Moreover, such a device can be easily adapted to different shapes of the joint to be sealed.

Advantageously, said device comprises a sealing product disposed at least partially around said at least one deformable element, at least when said clamping means of said device are in said clamping position, said sealing product being configured to plug spaces left free between said at least one deformable element and said at least one wall of said wing box and/or said at least one wall of the central fuselage.

According to a particular exemplary embodiment of the invention, said at least one deformable element has at least one deformable cavity containing said sealing product, said at least one deformable cavity being connected to the outside of said at least one deformable element by at least one channel, said at least one deformable cavity having an internal volume which becomes smaller during the clamping of said clamping means so as to force said sealing product to flow towards the outside of said at least one deformable element.

According to a particular aspect of the invention, said sealing device moreover comprises at least one intermediate rigid element disposed in said at least one deformable element or between at least two deformable elements when said device has a plurality of deformable elements, said at least one intermediate rigid element having a fourth bore extending coaxially with said first bore, in which said threaded shank is fitted.

According to another aspect of the invention, said at least one intermediate rigid element has a polygonal cross section, said at least one deformable element having a recess with a cross section of complementary shape to said at least one intermediate rigid element, or said at least two deformable elements receiving said at least one intermediate rigid element having faces with complementary shapes to said at least one intermediate rigid element.

The invention also proposes, according to one exemplary embodiment, a process for sealing a joint between at least one wall of a wing box of an aircraft and at least one wall of a central fuselage of said aircraft, said process comprising the following steps:
  introducing a sealing product between said at least one wall of said wing box and said at least one wall of said central fuselage;
  providing a sealing device as described above;
  inserting and positioning said sealing device between said at least one wall of the wing box and said at least one wall of the central fuselage of said aircraft; and
  clamping said clamping means from the inactive position into said clamping position.

The invention proposes, according to another exemplary embodiment, a process for sealing a joint between at least one wall of a wing box of an aircraft and at least one wall of a central fuselage of said aircraft, said process comprising the following steps:
  providing a sealing device as described above;
  inserting and positioning said sealing device between said at least one wall of the wing box and said at least one wall of the central fuselage of said aircraft; and
  clamping said clamping means from the inactive position into said clamping position.

According to one aspect of this other exemplary embodiment, said step of providing said sealing device comprises the following sub-steps:
  providing at least one deformable element having at least one cavity;
  injecting a sealing product into said at least one cavity of said at least one deformable element; and
  assembling said first rigid end element and second rigid end element on either side of said at least one deformable element and the clamping means.

The invention also proposes an aircraft comprising a wing box having at least one wall, a central fuselage having at least one wall, and at least one sealing device as described above, disposed between said at least one wall of the wing box and said at least one wall of the central fuselage.

BRIEF DESCRIPTION OF THE DRAWINGS

The aforementioned features of the invention, along with others, will become more clearly apparent upon reading the following description of several exemplary embodiments, said description being given with reference to the appended drawings, in which.

DETAILED DESCRIPTION OF THE PREFERRED EMBODIMENTS

Figure 1:
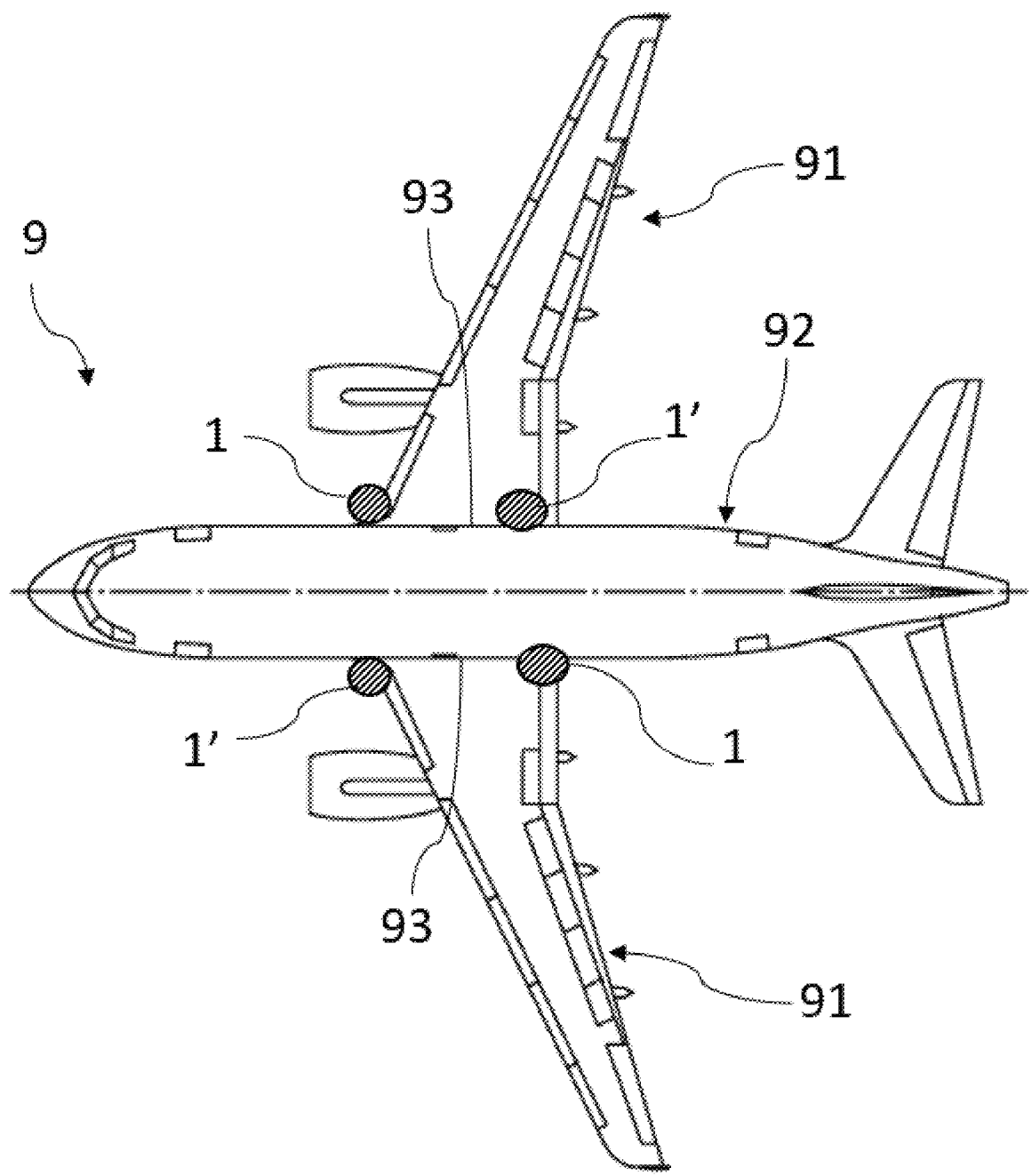
FIG. 1 is a top view of an aircraft implementing a plurality of sealing devices according to the invention.

FIG. 1 shows an aircraft 9 which comprises a central fuselage 92 and two wing boxes 91 (specifically a port-side wing box and a starboard-side wing box) which are joined to the central fuselage 92, each at a joint 93. When the wing box 91 of the aircraft 9 is used to form a fuel tank, it is necessary to ensure perfect sealing of the joint 93 between the wing box 91 and the central fuselage 92. To do this, the present invention implements a sealing device 1, 1' which makes it possible to ensure optimum sealing of the joint 93 while at the same time making it easier to install, this installation preferably being able to be carried out via the outside of the aircraft 9. The sealing device 1, 1' is intended to be implemented between at least one wall 911 of the wing box 91 and at least one wall 921 of the central fuselage 92 (as illustrated in the following figures).

FIGS. 2 to 5 illustrate a first embodiment of a sealing device 1 for sealing the joint 93 between a wing box 91 and a central fuselage 92 of an aircraft 9, and more particularly in this instance between a wall 911 of the wing box 91 and a wall 921 of the central fuselage 92.

The sealing device 1 comprises a first rigid end element 13 and a second rigid end element 15 having a first bore 131 and a second bore 151, respectively, which extend coaxially. One of the rigid end elements 13 and 15 has a recess 153 for receiving and holding a nut 171 described below. The recess 153 extends coaxially with the first bore 131 and the second bore 151.

The geometry of the rigid end elements 13 and 15 depends on the geometry of the cross section of the cavity to be sealed. For example, if the cavity has a circular cross section, it is preferable for the rigid end elements 13 and 15 to have the overall form of washers, whereas if the cavity has a rectangular cross section, it is preferable for the rigid end elements 13 and 15 to also have a rectangular shape. The rigid end elements 13 and 15 are for example made from metal or of a rigid plastic which is slightly deformable or not deformable in order to allow optimum transmission of the clamping force from the clamping means 17 over at least one deformable element 11 (described below).

The rigid end elements 13 and 15 are disposed on either side of at least one deformable element 11 and are intended to clamp this or these one or more deformable elements. In the example illustrated, the sealing device 1 comprises two deformable elements 11 which are disposed next to one another, or in series, between the rigid end elements 13 and 15. The rest of this description is based on this example but it will be easily understood that this description could be applied to a sealing device 1 implementing just one deformable element 11, or a greater number of deformable elements 11.

Each deformable element 11 has a main bore 111 which extends coaxially with the first bore 131 and second bore 151 of the rigid end elements 13 and 15.

The deformable elements 11 are intended to be deformed by coming into contact with, and more particularly to be pressed against, the wall 911 of the wing box 91 and the wall 921 of the central fuselage 92 to ensure the sealing of the joint 93. Preferably, and in order to ensure a deformation and a return to an initial position which are optimum and stable, the deformable elements 11 are made from elastomer.

The implementation of a plurality of deformable elements 11 makes it possible in particular to best adapt to the shapes of the spaces left free between the walls 911 of the wing box 91 and the walls 921 of the central fuselage 92, since these spaces can have sometimes complex and variable shapes.

The sealing device 1 moreover comprises clamping means 17 having a nut 171 and a clamping screw 173. The nut 171 has a tapped portion 1711 extending coaxially with the main bore 111. The nut 171 is disposed against one of the rigid end elements 13 and 15. More particularly, the nut 171 is positioned in the recess 153 formed in one of the rigid end elements 13 and 15 so as to prevent its rotation during the clamping of the clamping means 17. In this example, the recess 153 is formed in the second rigid end element 15.

The clamping screw 173 has a screw head 175 and a threaded shank 177. The screw head 175 is disposed against the other of the rigid end elements 15 and 13 (specifically against the first rigid end element 13 in this example) and the threaded shank 177 is fitted in succession in the first bore 131, in the main bores 111, and in the second bore 151 so as to be screwed in the tapped portion 1711 of the nut 171.

The clamping means 17 are movable between an inactive position and a clamping position. The clamping position depends, among other things, on the clamping force exerted on the clamping means 17.

In the inactive position (illustrated in FIG. 2), the clamping means 17 do not clamp the first rigid end element 13 and the second rigid end element 15 towards one another and thus leave the deformable elements 11 in an undeformed initial position. In a variant embodiment, it is conceivable, in the inactive position, for the clamping means 17 to exert a weak clamping force so as to keep the deformable elements 11 under tension, but not deform them.

In the clamping position (illustrated in FIG. 3), the clamping means 17 clamp the first rigid end element 13 and the second rigid end element 15 towards one another. The clamping of the rigid end elements 13 and 15 towards one another makes it possible to deform the deformable elements 11 by crushing until the outer surfaces of these deformable elements are pressed against the wall 911 of the wing box 91 and the wall 921 of the central fuselage 92 so as to seal the joint 93.

The rigid end elements 13 and 15 therefore make it possible, with the clamping means 17, to hold the elements of the sealing device 1 together, in particular before the clamping of the clamping means 17, and to apply the compressive force generated during the clamping of the clamping means to the deformable elements 11 so as to deform the deformable elements 11 by crushing.

In order to make the rest of the description easier to understand, it will be understood that the inactive position of the clamping means 17 corresponds to an inactive position of the sealing device 1 and that the clamping position of the clamping means 17 corresponds to a clamping position of the sealing device 1.

Figure 2:
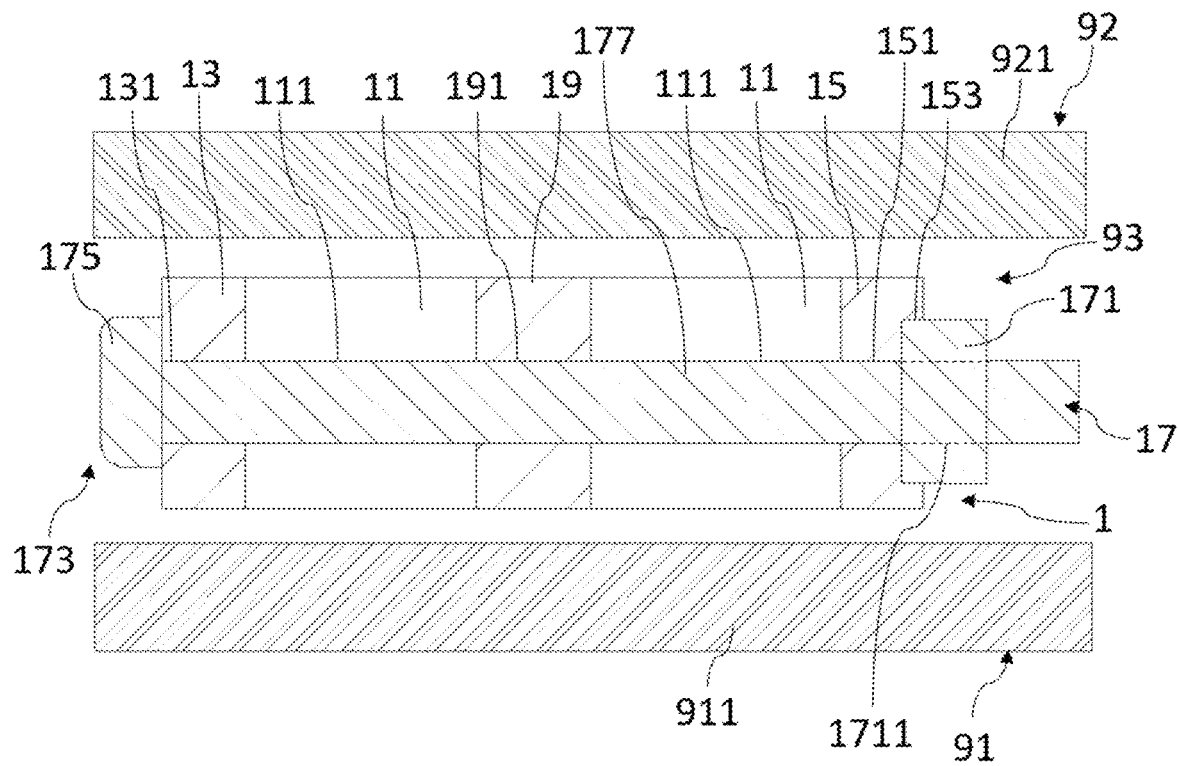
FIG. 2 is a side view, in section, of a sealing device according to a first embodiment of the invention, the clamping means of the sealing device being in an inactive position.
Figure 3:
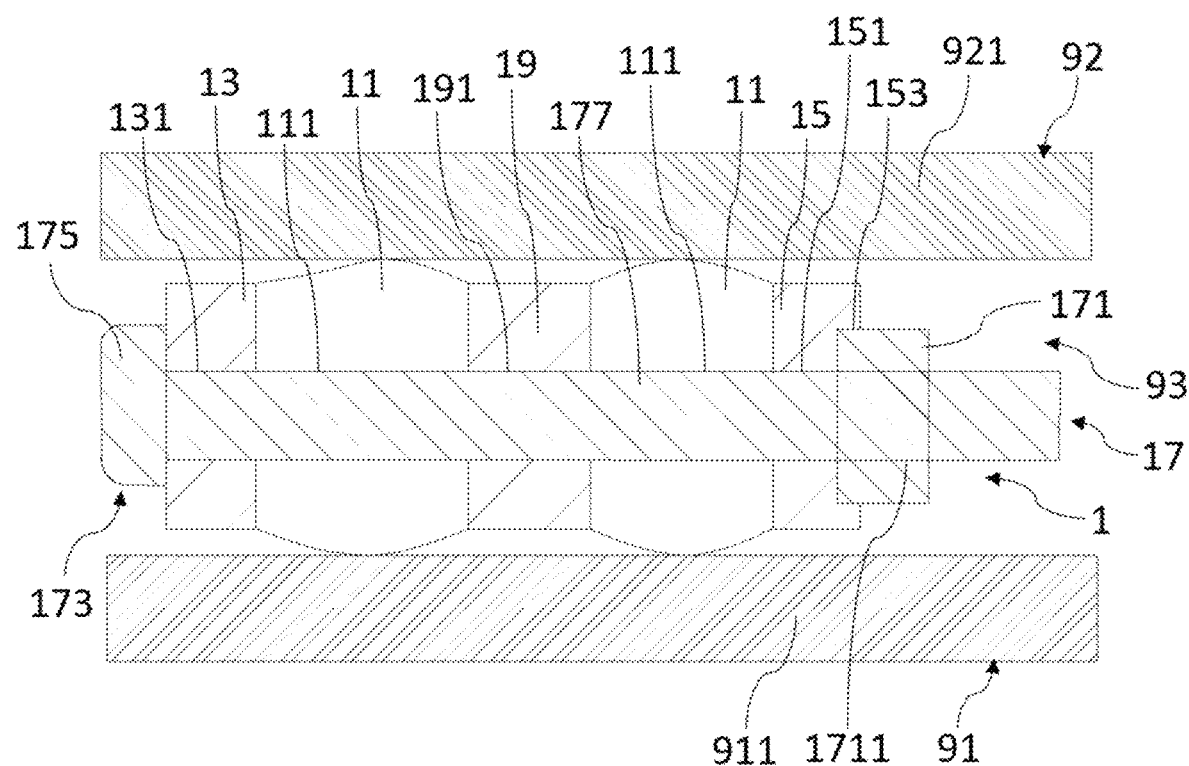
FIG. 3 is a side view, in section, of the sealing device in FIG. 2, the clamping means of the sealing device being in a clamping position.

Optionally, the sealing device 1 may comprise at least one intermediary rigid element 19 disposed within a deformable element 11 or, as illustrated in the example in FIGS. 2 and 3, between at least two deformable elements 11 when the sealing device 1 comprises a plurality of deformable elements 11. The intermediate rigid element 19 has a third bore 191, extending coaxially with the main bore 111, in which the threaded shank 177 of the clamping means 17 is fitted.

In this example, the sealing device 1 comprises an intermediate rigid element 19 disposed between the two deformable elements 11. The intermediate rigid element 19 in this instance has a parallelepipedal overall shape and separates the two deformable elements 11.

The implementation of an intermediate rigid element 19 makes it possible to ensure an optimum retention of the overall shape of the sealing device 1 and better transmission of the clamping forces from the clamping means 17 towards the one or more deformable elements 11. The intermediate rigid element 19 also makes it possible to dispose identical deformable elements 11 (which are thus manufactured using the same mold) in series on the clamping screw 173 so as to adapt to cavities of different lengths.

The sealing device 1 moreover comprises a sealing product 2 (not illustrated in FIGS. 2 and 3) disposed at least partially around the deformable elements 11, at least when the clamping means 17 of the sealing device 1 are in the clamping position. The sealing product 2 is configured to plug spaces left free between the deformable elements 11 and the wall 911 of the wing box 91 and/or the wall 921 of the central fuselage 92 when the sealing device 1 is in the clamping position.

The sealing product 2 is for example of the mastic type, and in particular of the packing mastic type.

Figure 4:
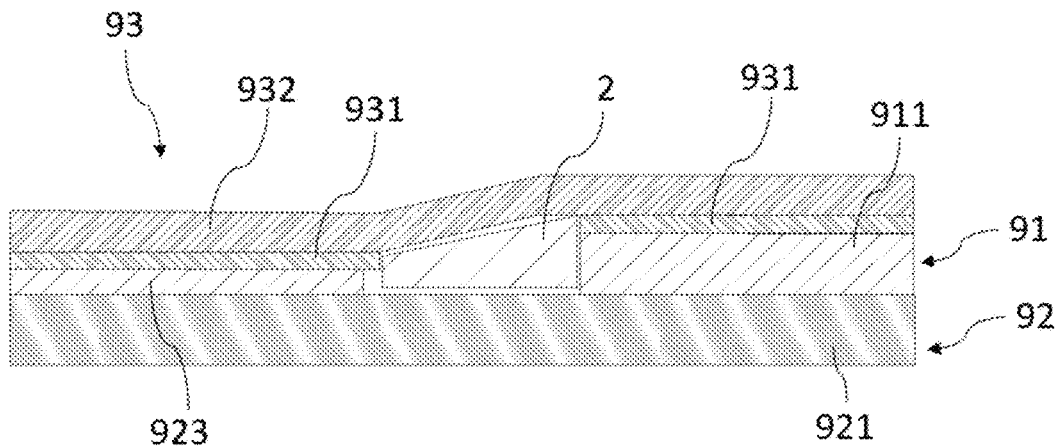
FIG. 4 is a side view, in section, of a joint between a wing box and a central fuselage of an aircraft before installation of a sealing device according to the invention.
Figure 5:
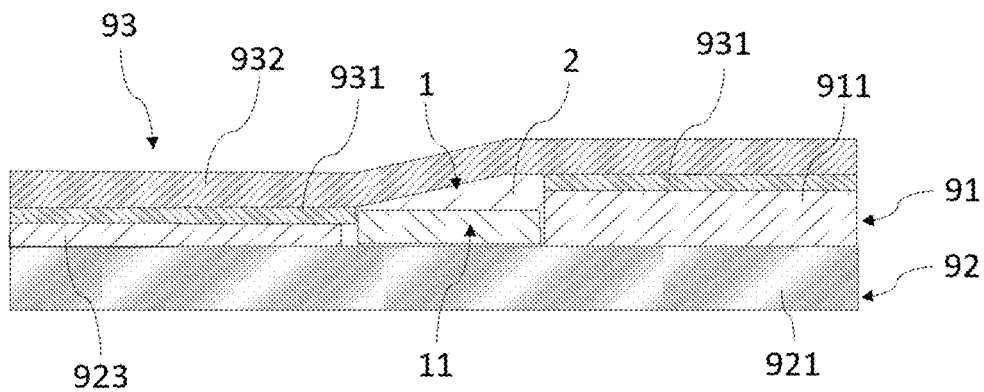
FIG. 5 is a side view, in section, of a joint between a wing box and a central fuselage of an aircraft according to FIG. 4 after installation of the sealing device in FIG. 2.
Figure 6:
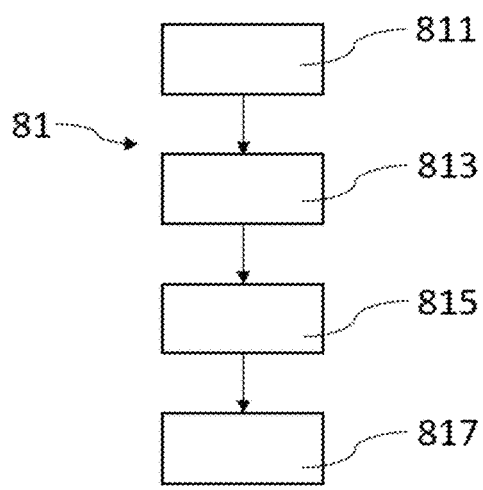
FIG. 6 schematically illustrates the steps of a sealing process implementing the sealing device in FIG. 2.

FIGS. 4 to 6 illustrate the use of a sealing device 1 in a process 81 for sealing a joint 93 between at least one wall 911 of the wing box 91 and at least one wall 921 of the central fuselage 92. In the example illustrated, the joint 93 to be sealed is between a wall 911 of a wing box 91 and the central fuselage 92 which in this instance has two walls respectively in the form of a structural element 921 of the door of the aircraft and a front vertical profile 923. The joint 93 moreover has a gasket 931 which extends, for the one part, between the front vertical profile 923 and a corner joint 932 and, for the other part, between the wall 911 of the wing box 91 and the corner joint 932.

The sealing process 81, which is preferably carried out from outside the aircraft 9, comprises the following steps:

introducing 811 a sealing product into the joint 93, specifically in this instance between at least one wall 911 of the wing box 91 and at least one wall 921 of the central fuselage 92, and more particularly in this instance into the space left free between the wall 911 of the wing box 91 and the walls 921, 923 of the fuselage 92;

providing 813 a sealing device 1 as described above in relation to FIGS. 2 and 3;

inserting and positioning 815 the sealing device 1 in the joint 93, specifically in this instance between the wing box 91 and the fuselage 92 (and more specifically in this instance between the wall 911 of the wing box 91 and the two walls 921, 923 of the central fuselage 92);

clamping 817 the clamping means 17 from the inactive position into the clamping position.

The introduction 811 of the sealing product 2 is, in the example illustrated in FIGS. 4 and 5, carried out in the space left free between the wing box 91 and the fuselage 92 using a corner joint 932 having a gasket 931 at least partially covering the joint 93 between the wing box 91 and the central fuselage 92. This introduction 811 of the sealing product 2, prior to the insertion of the device 1 into the joint 93, allows the sealing product 2 to spread, which is to say flow, around the sealing device 1 once the latter is positioned in the joint 93. After clamping of the clamping means 17 for deforming and pressing the deformable elements 11 against the wall 911 of the wing box 91 and the walls 921, 923 of the fuselage 92, the sealing product 2 present in the joint 93 around the deformable elements 11 will make it possible to plug any spaces left free between the deformable elements 11 and the wall 911 of the wing box 91 and/or the walls 921, 923 of the central fuselage 92.

Figure 7:
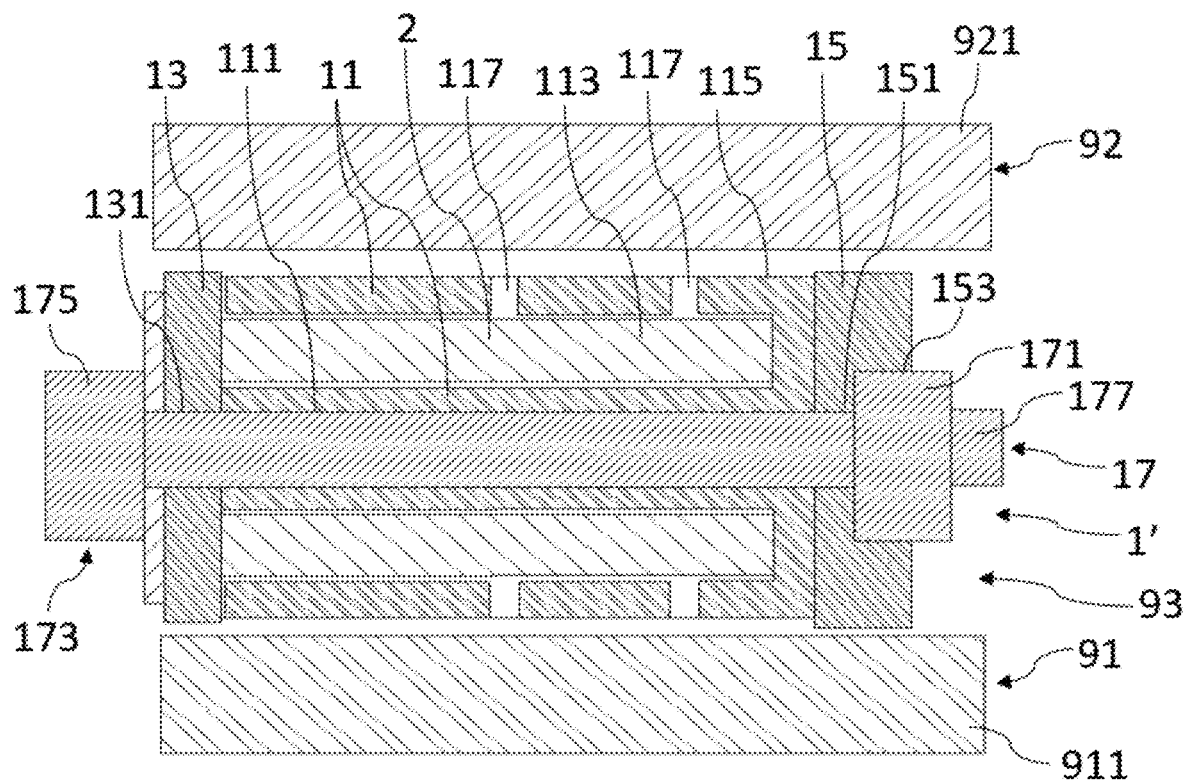
FIG. 7 is a side view, in section, of a sealing device according to a second embodiment of the invention, the clamping means of the sealing device being in an inactive position.
Figure 8:
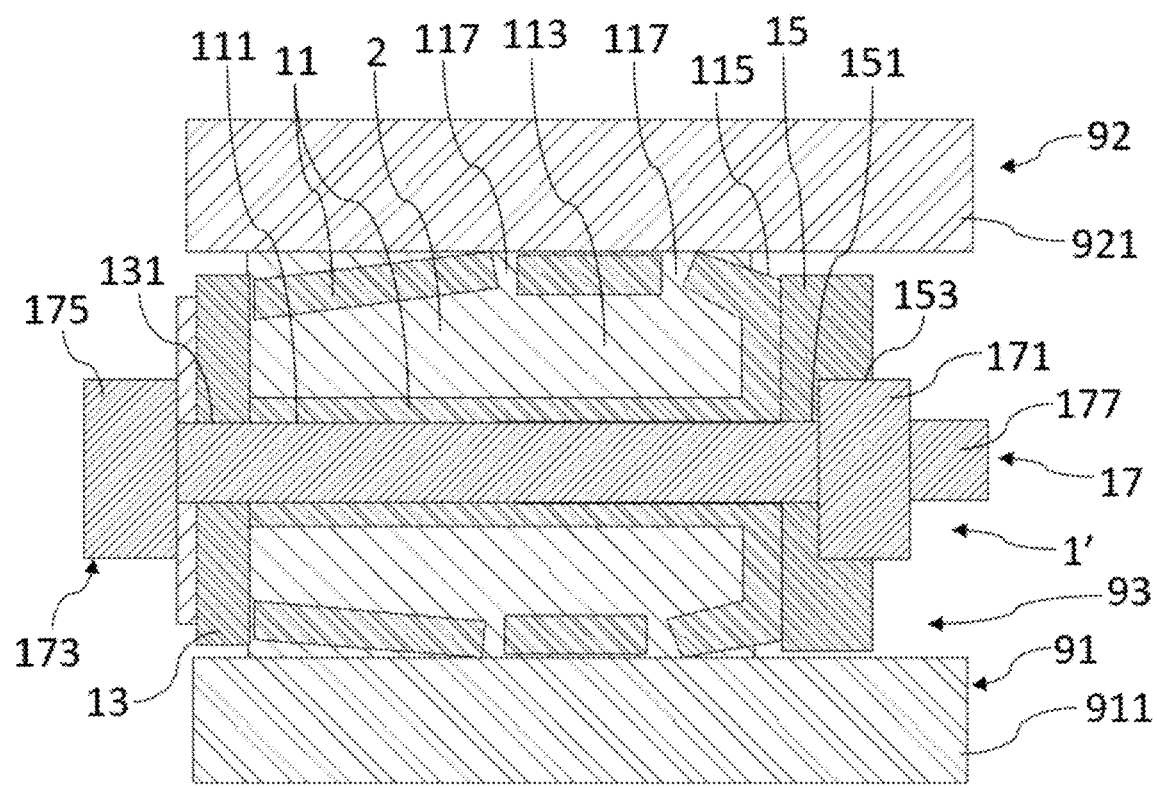
FIG. 8 is a side view, in section, of the sealing device in FIG. 7, the clamping means of the sealing device being in a clamping position.

FIGS. 7 and 8 illustrate a second embodiment of a sealing device 1' for sealing the joint 93 between a wing box 91 and a central fuselage 92 of an aircraft 9. As illustrated in this example, the sealing device 1' is disposed at the joint 93, in this instance between a wall 911 of the wing box 91 and a wall 921 of the central fuselage 92. FIG. 7 illustrates the sealing device 1' in its inactive position, whereas FIG. 8 illustrates the sealing device 1' in its clamping position.

In accordance with the first embodiment, the sealing device 1' according to the second embodiment comprises at least one deformable element 11, a first rigid end element 13 and second rigid end element 15, and clamping means 17. These elements have a structure and function which are substantially identical to those of the elements of the first embodiment and are therefore not described again in detail. The elements that are identical therefore have the same numerical references.

In the example illustrated, the second rigid end element 15 against which the nut 171 is disposed has a recess 153 for receiving and holding the nut 171, having a shape corresponding to the nut 171 such that the nut 171 is engaged with the second rigid end element 15 to avoid the rotation of the nut 171 during the clamping of the clamping means 17. In this way, it is possible to clamp the clamping means 17 from outside the aircraft, in particular.

The second embodiment differs from the first embodiment in that the sealing product 2 is contained in the one or more deformable elements 11 before the insertion of the sealing device 1' into the joint 93 and in that the sealing product 2 is therefore released from the one or more deformable elements 11 during the clamping of the clamping means 17.

To do this, at least one of the at least one deformable elements 11 has at least one deformable cavity 113 containing the sealing product 2. A cavity 113 is deformable in the sense that its internal volume becomes smaller during the clamping of the clamping means 17. Each cavity 113 is connected to the outside 115 of the deformable element 11 in which it is located by at least one channel 117. It is also conceivable for the cavities 113 to be interconnected.

In the example illustrated, the sealing device 1' has just one deformable element 11 having a single cavity 113 connected to the outside of the deformable element 11 by a plurality of channels 117. The rest of this description is based on this example but it will be easily understood that this description could be applied to a sealing device 1 implementing a greater number of deformable elements 11 and/or cavities 113.

When the clamping means 17 are passing from the inactive position (FIG. 7) to the clamping position (FIG. 8), the volume of the cavity 113 will become smaller, thus forcing the sealing product 2 to flow out of the cavity 113 through the one or more channels 117 so as to be distributed around the deformable element 11. In this way, the sealing product 2 is disposed around the deformable element 11 when the sealing device 1' is in the clamping position, thus making it possible to plug any spaces left free between the deformable element 11 and the wall 911 of the wing box 91 and/or the wall 921 of the central fuselage 92.

A cavity 113 therefore makes it possible to contain the sealing product within a deformable element 11 before the clamping of the clamping means 17 and, during the clamping of the clamping means 17, to release the sealing product 2 to ensure optimum sealing of the joint 93. The viscosity of the sealing product 2 is preferably selected such that the sealing product 2 cannot flow out of the cavity 113 through the channels 177 before the clamping of the clamping means 17. As a result, the sealing product 2 remains in the cavity 113 even while the device 1' is being positioned in the joint 93, as described below.

Figure 9:
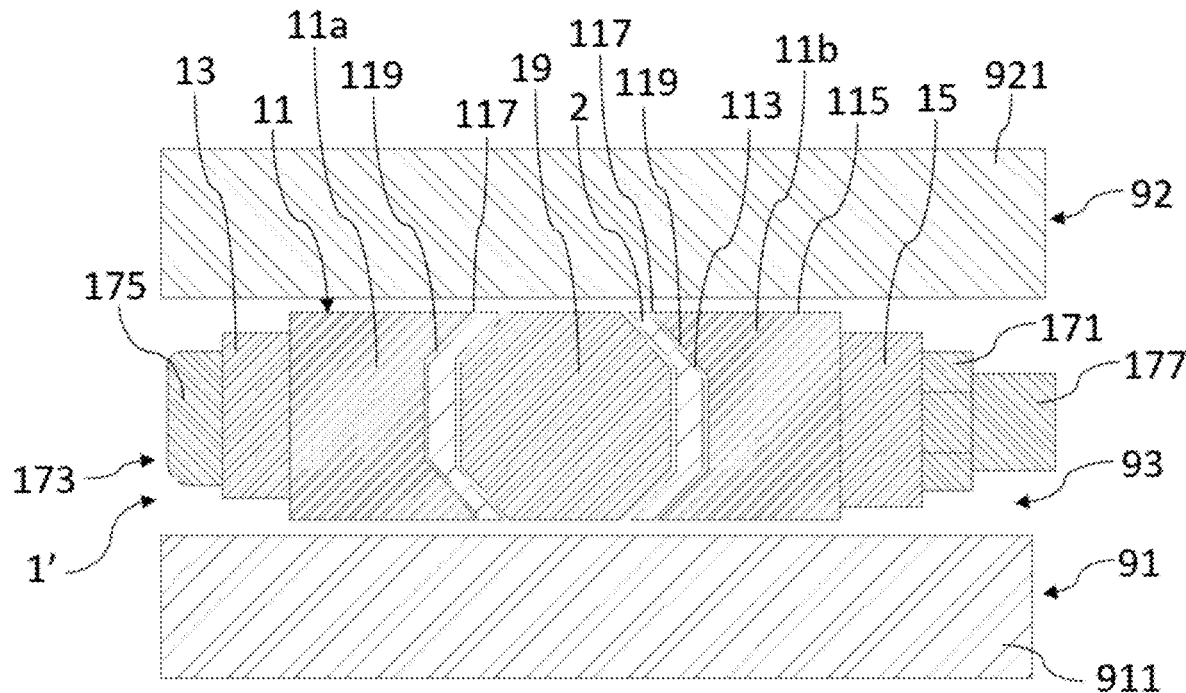
FIG. 9 is a side view, in section, of a variant of the sealing device in FIG. 7, the clamping means of the sealing device being in an inactive position.

In a variant of the second embodiment, the sealing device 1' comprises at least one intermediate rigid element 19 disposed within a deformable element 11 or between at least two deformable elements 11. In the example illustrated in FIGS. 9 and 10, the sealing device 1' comprises an intermediate rigid element 19 disposed in a deformable element 11 having two parts 11a, 11b. As above, the intermediate rigid element 19 has a fourth bore (not shown in these figures) in which the threaded shank 177 of the clamping means 17 is fitted.

The deformable element 11 receiving the at least one intermediate rigid element 19 has a recess 119 with a cross section of complementary shape to the at least one intermediate rigid element 19. When the sealing device 1' comprises at least two deformable elements 11 receiving said at least one intermediate rigid element 19, the deformable elements 11 have faces with complementary shapes to said at least one intermediate rigid element 19.

In this example, the intermediate rigid element 19 has an octagonal overall shape and separates the two parts 11a, 11b of the deformable element 11. The faces of the two parts 11a, 11b facing one another and interacting with the intermediate rigid element 19 each have a recess 119 with a shape corresponding to the intermediate rigid element 19 when the sealing device 1' is in the inactive position, in particular.

In this variant, the sealing product 2 is contained in a cavity 113 formed between the two parts 11a, 11b of the deformable element 11. The intermediate rigid element 19 is disposed within this cavity 113. The channels 117 allowing the sealing product 2 to flow out of the cavity are in this instance formed at the intersection of the two parts 11a, 11b of the deformable element 11 with the intermediate rigid element 19.

In this variant, the implementation of an intermediate rigid element 19 also makes it possible to provide optimum retention of the overall shape of the device 1' and better transmission of the clamping forces from the clamping means 17 towards the deformable element 11, to ensure a desired deformation of the deformable element 11 and a controlled flow of the sealing product 2 towards the outside 115 of the deformable element 11.

FIGS. 11 to 15 illustrate the use of a sealing device 1' in a process 82 for sealing a joint 93 between at least one wall 911 of a wing box 91 and at least one wall 921 of the central fuselage 92.

Figure 10:
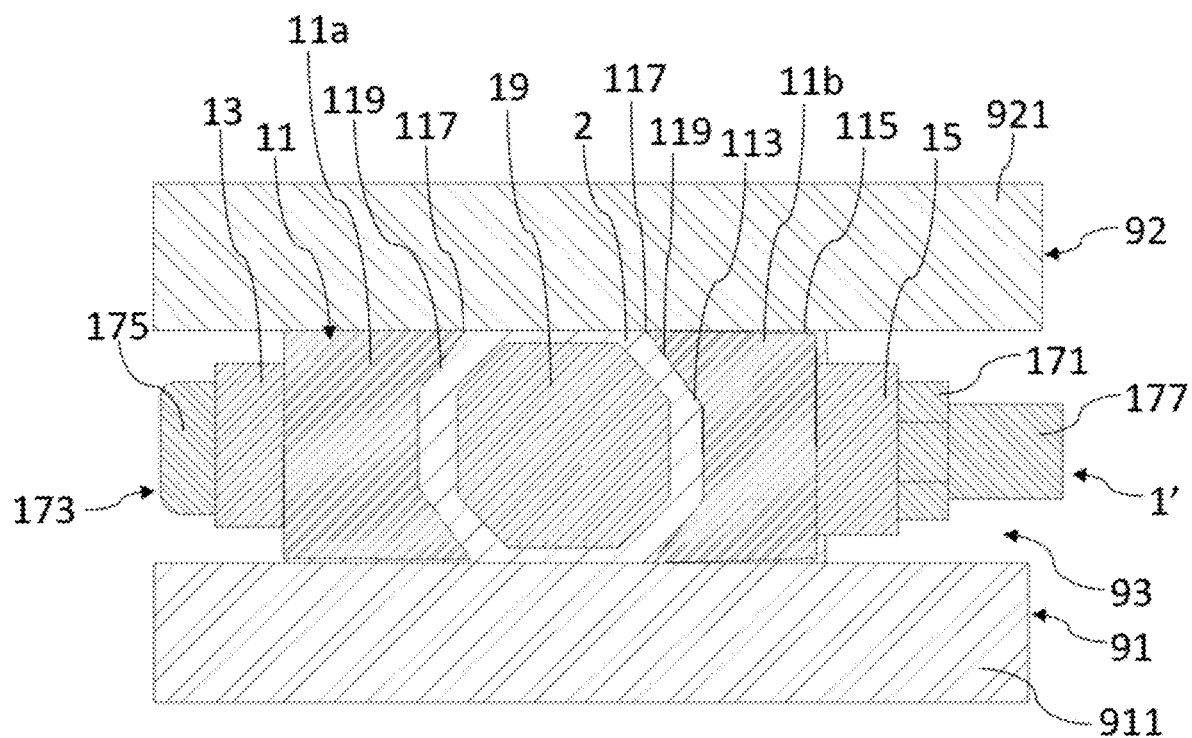
FIG. 10 is a side view, in section, of the sealing device in FIG. 9, the clamping means of the sealing device being in a clamping position.
Figure 11:
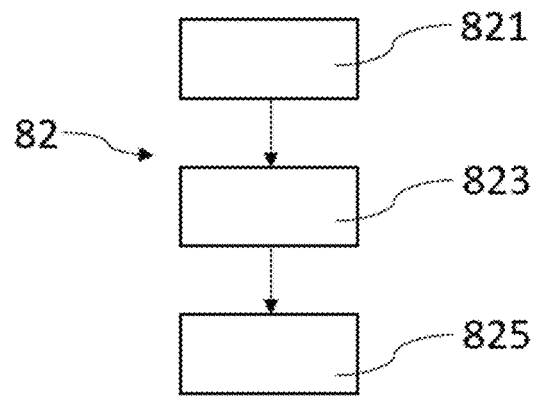
FIG. 11 schematically illustrates the steps of a sealing process implementing the sealing device in FIG. 7 or in FIG. 9.
Figure 12:
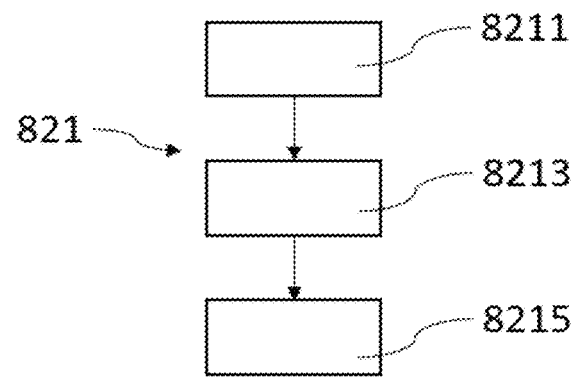
FIG. 12 schematically illustrates the sub-steps of one of the steps of the sealing process in FIG. 11.

The sealing process 82, which is preferably carried out from outside the aircraft 9, comprises the following steps (illustrated in FIG. 11):

providing 821 a sealing device 1' as described above in relation to FIGS. 7 to 10;

inserting (FIG. 15) and positioning (FIGS. 7 and 9) 823 the sealing device 1' in the joint 93, which is to say between the at least one wall 911 of the wing box 91 and the at least one wall 921 of the central fuselage 92;

clamping 825 the clamping means 17 from the inactive position into the clamping position (FIGS. 8 and 10).

The clamping step 825 consists in clamping the clamping means 17 until the at least one deformable element 11 is pressed against the at least one wall 911 of the wing box 91 and the at least one wall 921 of the central fuselage 92. The clamping 825 also allows the sealing product 2 contained in the one or more cavities 113 to flow out of the one or more cavities 113 towards the outside 115 of the sealing device 1' to plug any spaces left free between the one or more deformable elements 11 and the at least one wall 911 of the wing box 91 and/or the at least one wall 921 of the central fuselage 92.

The providing step 821 for providing a sealing device 1' comprises the following sub-steps (illustrated schematically in FIG. 12):

providing 8211 at least one deformable element 11 having at least one cavity 113;

injecting 8213 (FIG. 13) a sealing product 2 into said at least one cavity 113 of said at least one deformable element 11;

assembling 8215 (FIG. 14) the first rigid end element 13 and second rigid end element 15 on either side of said at least one deformable element 11 and the clamping means 17.

In a variant, during the providing sub-step 8211 for providing the at least one deformable element 11, one of the first and second rigid end elements 13, 15 may already be joined to said at least one deformable element 11, in particular if they are the rigid end elements 13, 15 that make it possible to close the one or more cavities 113.

Figure 13:
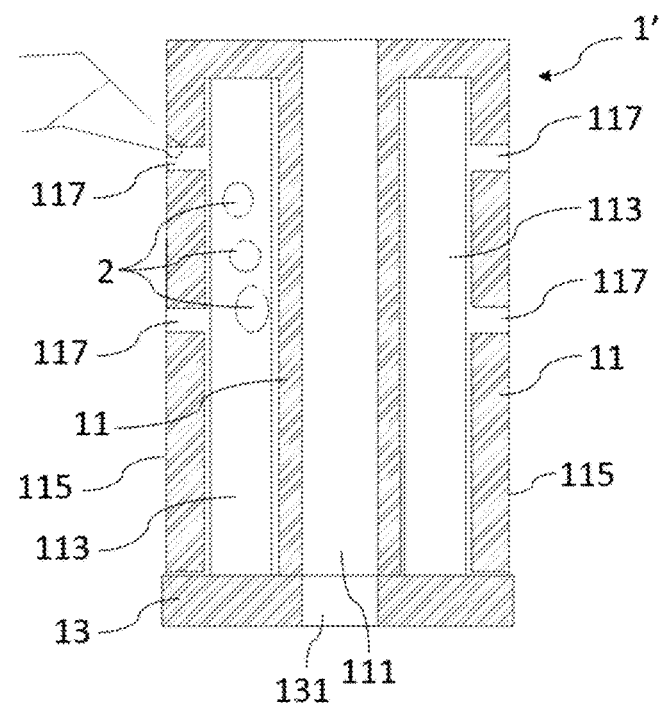
FIG. 13 illustrates a sub-step of the sealing process in FIG. 12.
Figure 14:
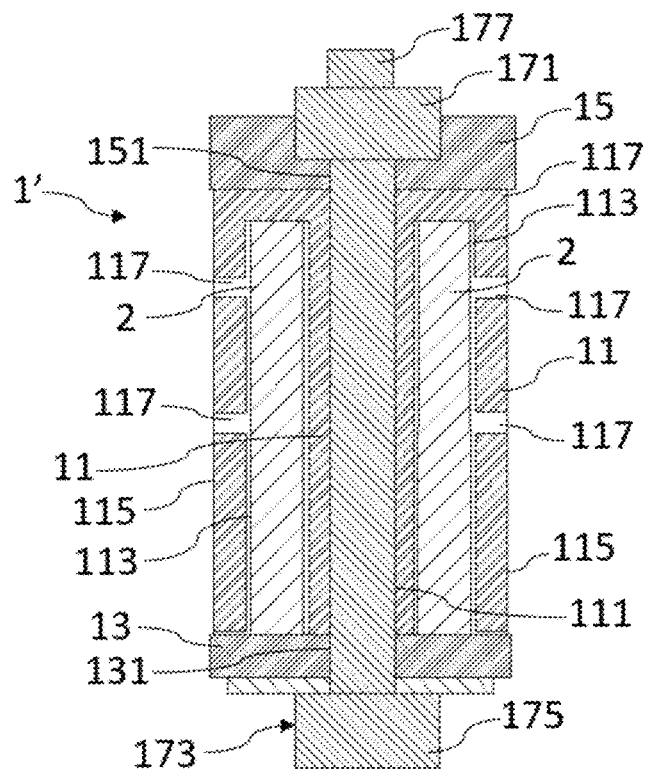
FIG. 14 illustrates another sub-step of the sealing process in FIG. 12.
Figure 15:
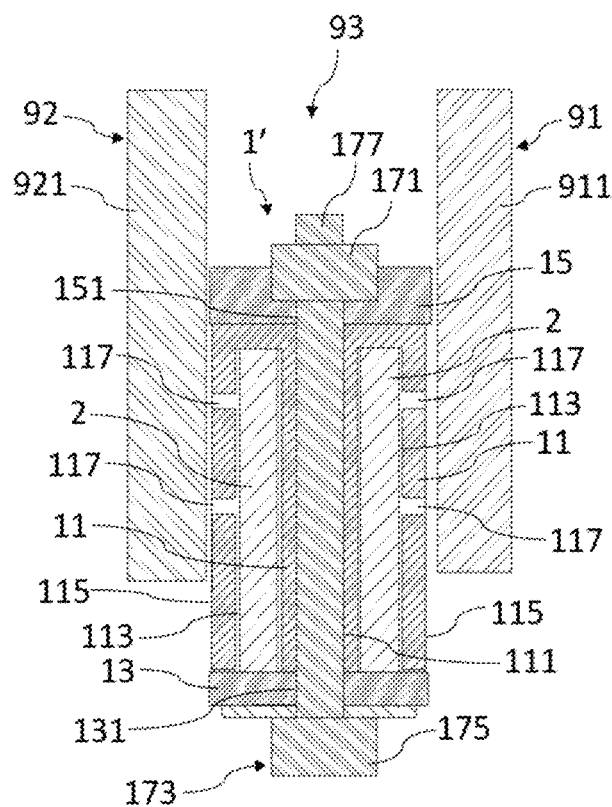
FIG. 15 illustrates a step of the sealing process in FIG. 11.

The injecting sub-step 8213 for injecting the sealing product 2 into said at least one cavity 113 can be performed via the channels 117 (as illustrated in FIG. 13) or directly into the one or more cavities 113 if the latter are open before the assembly of the rigid end elements 13 and 15.

It should be noted that the providing steps (813 for the first embodiment and 821 for the second embodiment) for providing the sealing device 1, 1' are preferably carried out outside the aircraft 9, for example directly on a workbench in the vicinity of the aircraft 9 or else in the factories of a supplier. It is therefore possible to provide, or manufacture, a sealing device 1, 1' specifically adapted to the shape of the joint 93, whatever the geometric shape and the dimensions of the latter. Specifically, the rigid end elements and the one or more deformable elements 11 can be adapted, in terms of shape and dimensions, to the opening of the joint 93 that must be sealed.

Preferably, the entire sealing process 81, 82 is carried out from outside the aircraft so as to limit the ergonomic constraints and make the operators' work easier.

The sealing device 1, 1' of the invention makes it possible to implement a solid element in the opening of the joint 93 to be sealed, thus forming a reliable and secure solution for sealing such a joint.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for sealing a joint between at least one wall of a wing box of an aircraft and at least one wall of a central fuselage of said aircraft, said device comprising:

at least one deformable element having a main bore, said at least one deformable element configured to come into direct contact with both said at least one wall of said wing box and said at least one wall of said central fuselage of said aircraft;

a first rigid end element having a first bore and a second rigid end element having a second bore, said first bore and second bore extending coaxially with said main bore, said rigid end elements being disposed on either side of said at least one deformable element and configured to clamp said at least one deformable element; and clamping means having a nut and a clamping screw, said nut having a tapped portion and being disposed against one of said first and second rigid end elements and said clamping screw having a screw head and a threaded shank, said screw head being disposed against the other of said first and second rigid end elements and said threaded shank being fitted in said main bore and in said first bore and said second bore so as to be screwed to said nut;

wherein said clamping means are configured to move between an inactive position, in which said clamping means do not clamp the first rigid end element and the second rigid end element towards one another and leave said at least one deformable element in an undeformed initial position, and a clamping position, in which said clamping means clamp the first rigid end element and the second rigid end element towards one another by deforming said at least one deformable element by crushing until said at least one deformable element is pressed directly against said at least one wall of said wing box and directly against said at least one wall of the central fuselage; and wherein said rigid end element against which said nut is disposed has a recess for receiving and holding said nut, preventing a rotation of said nut relative to said rigid end element during the clamping and unclamping of said clamping means.

2. The device according to claim 1, further comprising:
a sealing product disposed at least partially around said at least one deformable element, at least when said clamping means of said device are in said clamping position, said sealing product configured to plug spaces left free between said at least one deformable element and said at least one wall of said wing box, or said at least one wall of the central fuselage, or both.

3. The device according to claim 2, wherein said at least one deformable element has at least one deformable cavity containing said sealing product, said at least one deformable cavity connected to the outside of said at least one deformable element by at least one channel, said at least one deformable cavity having an internal volume which becomes smaller during a clamping of said clamping means so as to force said sealing product to flow towards an outside of said at least one deformable element.

4. The device according to claim 1, further comprising:
at least one intermediate rigid element disposed in said at least one deformable element or between at least two deformable elements when said device has a plurality of deformable elements, said at least one intermediate rigid element having a third bore extending coaxially with said first bore, in which said threaded shank is fitted.

5. The device according to claim 4, wherein said at least one intermediate rigid element has a polygonal cross section, said at least one deformable element having a recess with a cross section of complementary shape to said at least one intermediate rigid element, or said at least two deformable elements receiving said at least one intermediate rigid element having faces with complementary shapes to said at least one intermediate rigid element.

6. The device according to claim 1, wherein said threaded shank extends along a direction parallel to said at least one wall of said wing box and said at least one wall of said central fuselage of said aircraft.

7. The device according to claim 1, wherein said rigid end element against which said nut is disposed is positioned between said nut and said at least one deformable element.

8. A process for sealing a joint between at least one wall of a wing box of an aircraft and at least one wall of a central fuselage of said aircraft, said process comprising the following steps:
introducing a sealing product between said at least one wall of said wing box and said at least one wall of said central fuselage;
providing the device according to claim 1;
inserting and positioning said sealing device between said at least one wall of the wing box and said at least one wall of the central fuselage of said aircraft; and
clamping said clamping means from the inactive position into said clamping position.

9. A process for sealing a joint between at least one wall of a wing box of an aircraft and at least one wall of a central fuselage of said aircraft, said process comprising the following steps:
providing the device according to claim 3;
inserting and positioning said sealing device between said at least one wall of the wing box and said at least one wall of the central fuselage of said aircraft; and
clamping said clamping means from the inactive position into said clamping position.

10. The process according to claim 9, wherein said providing step has the following sub-steps:
providing the at least one deformable element having at least one cavity;
injecting a sealing product into said at least one cavity of said at least one deformable element; and
assembling said first rigid end element and second rigid end element on either side of said at least one deformable element and the clamping means.

11. An aircraft comprising:
a wing box having at least one wall,
a central fuselage having at least one wall, and
at least one sealing device according to claim 1 disposed between said at least one wall of the wing box and said at least one wall of the central fuselage.

12. A device for sealing a joint between at least one wall of a wing box of an aircraft and at least one wall of a central fuselage of said aircraft, said device comprising:
at least one deformable element having a main bore, said at least one deformable element configured to come into contact with said at least one wall of said wing box and said at least one wall of said central fuselage of said aircraft;
a first rigid end element having a first bore and a second rigid end element having a second bore, said first bore and second bore extending coaxially with said main bore, said rigid end elements being disposed on either side of said at least one deformable element and configured to clamp said at least one deformable element;
clamping means having a nut and a clamping screw, said nut having a tapped portion and being disposed against one of said first and second rigid end elements and said clamping screw having a screw head and a threaded shank, said screw head being disposed against the other of said first and second rigid end elements and said threaded shank being fitted in said main bore and in said first bore and said second bore so as to be screwed to said nut; and
at least one intermediate rigid element disposed in said at least one deformable element or between at least two deformable elements when said device has a plurality of deformable elements, said at least one intermediate rigid element having a third bore extending coaxially with said first bore, in which said threaded shank is fitted;
wherein said clamping means are configured to move between an inactive position, in which said clamping means do not clamp the first rigid end element and the second rigid end element towards one another and leave said at least one deformable element in an undeformed initial position, and a clamping position, in which said clamping means clamp the first rigid end element and the second rigid end element towards one another by deforming said at least one deformable element by crushing until said at least one deformable element is pressed against said at least one wall of said wing box and against said at least one wall of the central fuselage; and
wherein said rigid end element against which said nut is disposed has a recess for receiving and holding said nut, preventing a rotation of said nut relative to said rigid end element during the clamping and unclamping of said clamping means.

13. The device according to claim 12, wherein said at least one intermediate rigid element has a polygonal cross section, said at least one deformable element having a recess with a cross section of complementary shape to said at least one intermediate rigid element, or said at least two deformable elements receiving said at least one intermediate rigid element having faces with complementary shapes to said at least one intermediate rigid element.

* * * * *